United States Patent [19]

Beeding

[11] Patent Number: 5,141,212
[45] Date of Patent: Aug. 25, 1992

[54] VACUUM CHUCK WITH FOAM WORKPIECE-SUPPORTING SURFACE

[75] Inventor: Jack D. Beeding, Rockford, Ill.

[73] Assignee: Ekstrom Carlson & Co., Rockford, Ill.

[21] Appl. No.: 681,982

[22] Filed: Apr. 8, 1991

[51] Int. Cl.$^5$ .............................................. B25B 11/00
[52] U.S. Cl. ..................................... 269/21; 248/363; 83/451
[58] Field of Search .............. 279/3; 269/21; 248/363, 248/362; 83/451, 452, 941; 409/219; 51/235; 144/278 A

[56] References Cited

U.S. PATENT DOCUMENTS

| | | | |
|---|---|---|---|
| 3,334,586 | 8/1967 | Jaffa et al. | 248/363 |
| 3,777,604 | 12/1973 | Gerber | 83/941 |
| 3,790,154 | 2/1974 | Gerber et al. | 83/451 X |
| 3,848,327 | 11/1974 | Gerber et al. | 83/941 |
| 4,049,484 | 9/1977 | Priest et al. | 269/21 X |
| 4,543,862 | 10/1985 | Levene et al. | 269/21 X |
| 4,656,906 | 4/1987 | Mozieka et al. | 269/21 X |
| 4,675,242 | 6/1987 | Hashimoto et al. | 269/21 X |
| 4,718,629 | 1/1988 | Block et al. | 248/363 |
| 4,723,766 | 2/1988 | Beeding | 269/21 |
| 4,808,046 | 2/1989 | Pilkington et al. | 269/21 X |
| 4,850,579 | 7/1989 | Fischer | 83/451 X |

Primary Examiner—Larry I. Schwartz
Assistant Examiner—Robert Schultz
Attorney, Agent, or Firm—Leydig, Voit & Mayer

[57] ABSTRACT

A vacuum chuck includes a lower base with vacuum plenums, a permanent metal plate with vertically extending holes which communicate with the plenums, a panel of particle board with vertically extending holes disposed in registry with the holes in the metal plate, and a sheet of open cell foam covering the particle board and defining the top surface of the chuck. When a vacuum is drawn in the plenums, it is disbursed beneath the foam sheet via the holes and acts through the foam sheet to clamp the workpiece tightly with respect to the metal plate. During cutting of the workpiece into individual piece parts, a cutting tool cuts through the workpiece and the foam sheet but is prevented by the particle board from cutting into the permanent metal plate.

5 Claims, 2 Drawing Sheets

VACUUM CHUCK WITH FOAM WORKPIECE-SUPPORTING SURFACE

BACKGROUND OF THE INVENTION

This invention relates to a vacuum chuck and, more particularly, to a vacuum chuck for supporting and rigidly clamping a workpiece during cutting of the workpiece by the cutting tool of a machine tool. The present vacuum chuck is particularly useful in connection with a machine tool such as a router having a rotating router bit which traverses across and cuts through a large sheet metal workpiece and forms the workpiece into smaller individual piece parts of various shapes.

A vacuum chuck conventionally includes a lower base having a vacuum plenum which is covered by a horizontal metal top plate formed with a series of vertically extending holes. When vacuum is applied to the plenum, the workpiece is clamped to the top plate by virtue of the vacuum acting through the holes and against the lower side of the workpiece.

Difficulty is encountered in using a vacuum chuck in operations such as a routing operation where the tool cuts completely through the workpiece. In such situations, steps must be taken to prevent the lower end of the tool from cutting into and ruining the metal top plate of the chuck. One solution to this problem is to provide so-called spoiler plates for spacing the workpiece above the top plate.

A spoiler plate conventionally comprises a sheet of soft wood or particle board having a shape similar to the shape of the piece part to be cut and having peripheral dimensions the same as or just slightly larger than the piece part. A groove having the same general shape as the piece part and having peripheral dimensions slightly less than the piece part is formed in the upper side of the spoiler plate and serves as as retainer for a gasket made of closed cell foam and adapted to project a short distance above the spoiler plate. In addition, a cavity or plenum having the same general shape as the piece part is formed in the upper side of the spoiler plate within the confines of the gasket. A vertical hole is formed through the spoiler plate in order to establish communication between the plenum of the spoiler plate and the vacuum holes in the top plate of the vacuum chuck.

The spoiler plate is placed on the top plate of the vacuum chuck in underlying relation with that area of the workpiece from which the particular piece part is to be cut. When vacuum is applied to the chuck, it acts within the plenum of the spoiler plate to draw the workpiece downwardly against the spoiler plate. As the workpiece is drawn downwardly, the gasket compresses so as to seal around the plenum in the spoiler plate and thereby cause the workpiece to be clamped tightly to the spoiler plate. During the cutting operation, the tool cuts through the workpiece and into the upper surface of the soft spoiler plate but does not reach to the metal top plate of the chuck since the spoiler plate holds the workpiece in vertically spaced relation with the top plate.

When the piece parts of many different sizes and shapes are cut from workpieces, the use of spoiler plates is expensive, time-consuming and cumbersome. A customized spoiler plate must be made for each piece part of different size or shape and must be placed on the top plate of the vacuum chuck in the specific area of the piece part. Each time the machine tool is changed over to cut different piece parts, the previously used spoiler plates must be replaced with different spoiler plates. Significant floor space is required to store all of the customized spoiler plates necessary for a multitude of piece parts of various sizes and shapes.

SUMMARY OF THE INVENTION

The general aim of the present invention is to provide a new and improved vacuum chuck which completely eliminates the need for customized spoiler plates or similar customized components while enabling the cutting tool to cut completely through the workpiece without cutting into the metal top plate of the chuck.

A more detailed object of the invention is to achieve the foregoing by utilizing a thin sheet of open cell foam to form the upper surface of the chuck. The foam defines a porous surface enabling the vacuum from the top plate of the chuck to be disbursed widely beneath the workpiece and, when compressed, the foam defines a surface having a high coefficient of friction for preventing slippage of the workpiece. A perforated plate of relatively soft material preferably is sandwiched between the foam sheet and the metal top plate of the chuck. During the cutting operation, the cutting tool cuts through the workpiece and the foam and may cut into the soft intermediate plate but remains short of the metal top plate of the chuck.

The invention also resides in the unique coaction of holes in the soft intermediate plate with the holes in the permanent plate of the chuck to enable good disbursement of the vacuum beneath the foam sheet while restricting leakage of vacuum once the cutting tool has cut through the foam sheet.

Another object of the invention is to provide a method of cutting a workpiece while the workpiece is clamped by vacuum against a foam sheet which also is cut during cutting of the workpiece.

These and other objects and advantages of the invention will become more apparent from the following detailed description when taken in conjunction with the accompanying drawings.

DETAILED DESCRIPTION OF THE PREFERRED EMBODIMENT

Figure 1:
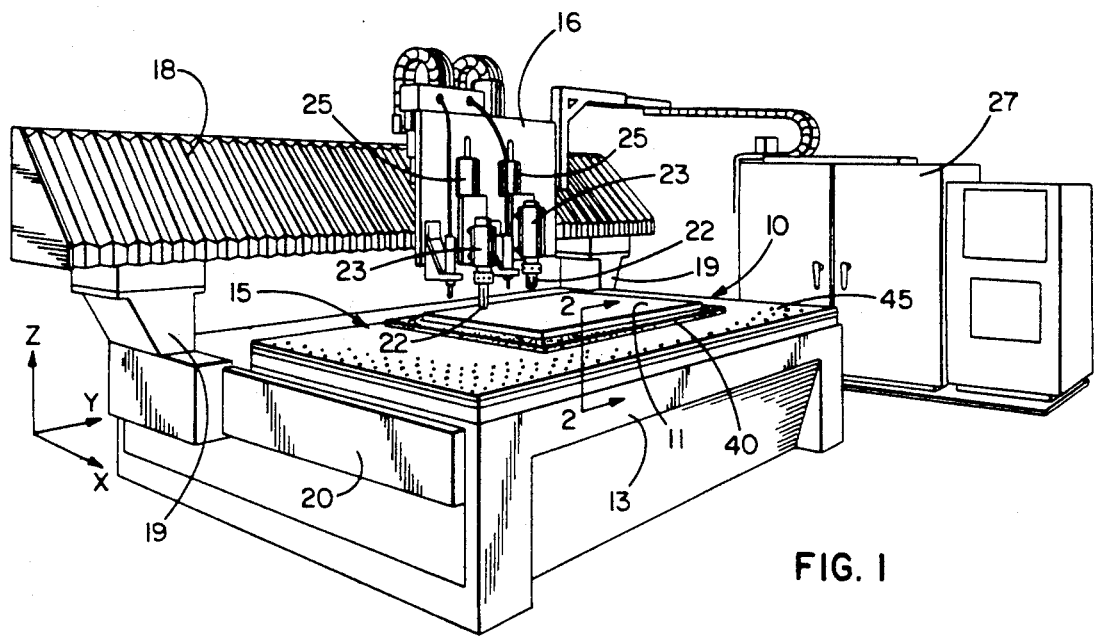
FIG. 1 is a perspective view of a typical machine tool equipped with a new and improved vacuum chuck incorporating the unique features of the present invention.

For purposes of illustration, the invention has been shown in the drawings in conjunction with a machine tool 10 for performing cutting operations on a workpiece 11. The particular machine tool which has been shown is a router and is adapted to cut the workpiece into several individual piece parts of preselected shapes and sizes.

The router 10 includes a bed 13 which serves as an integral foundation for supporting the various components and power drives of the router. Located on the bed is a work table 15 which is adapted to rigidly support the workpiece 11 during cutting operations performed by a cutting head indicated generally at 16. The head is mounted on guideways 18 which define a slide permitting sideways movement of the head along the Y-axis relative to the work table 15. The Y-axis guideways are carried on either end by uprights 19. The uprights 19 are supported on guideways 20 which permit lateral movement of the uprights, and thus the guideways 19 and the head 18, along the X-axis relative to the work table 15.

The head 16 includes one or more router cutters or bits 22 and cutter drives 24 mounted on supports 25 which permit vertical displacement of the router bits along the Z-axis relative to the work table 15 thereby to set the depth of cut of the bits. The illustrated head includes two independently controllable router drives operable to rotate the router bits 22.

In a typical operation, the workpiece 11 is held in a fixed position on the work table 15 while one of the router bits 22 is traversed along the mutually perpendicular axes X and Y under the control of a numerical control unit 27. The bit 22 is located along the Z-axis to such a depth that it cuts completely through the workpiece. In this way, individual piece parts of various sizes and shapes may be cut from the workpiece with the workpiece eventually being reduced to a so-called skeleton.

Figure 2:
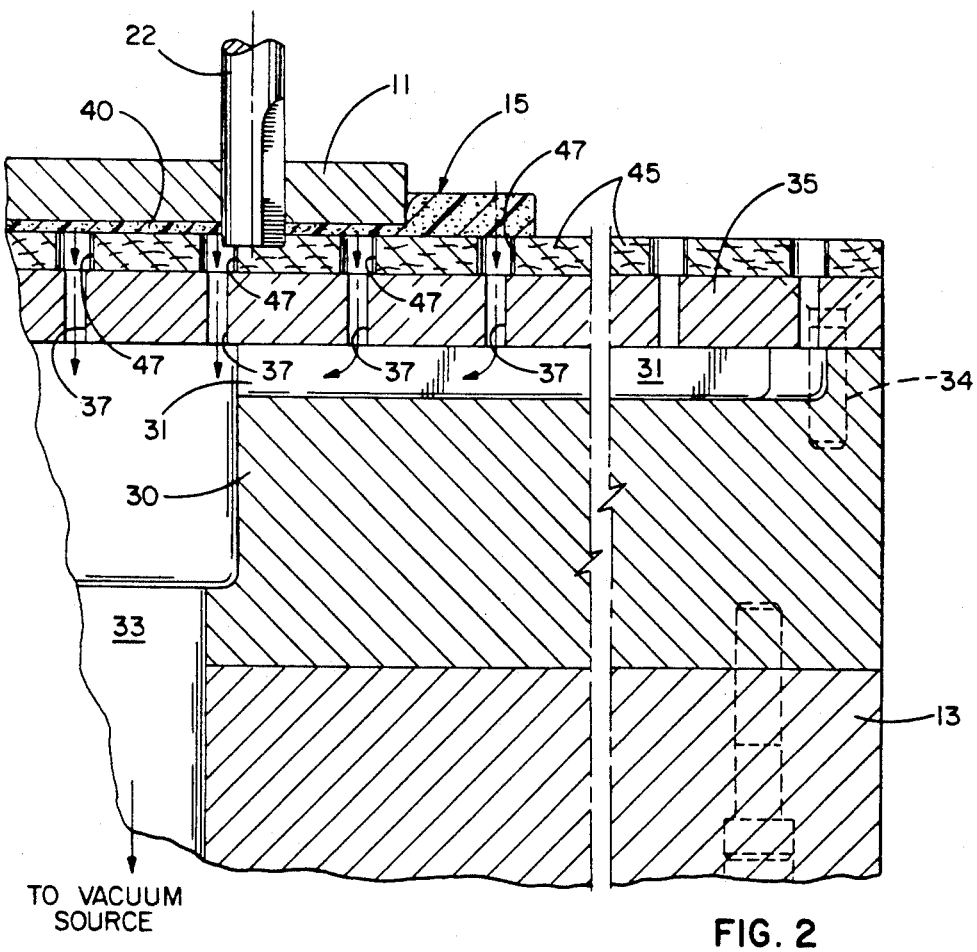
FIG. 2 is an enlarged fragmentary cross-section taken substantially along the line 2—2 of FIG. 1.
Figure 3:
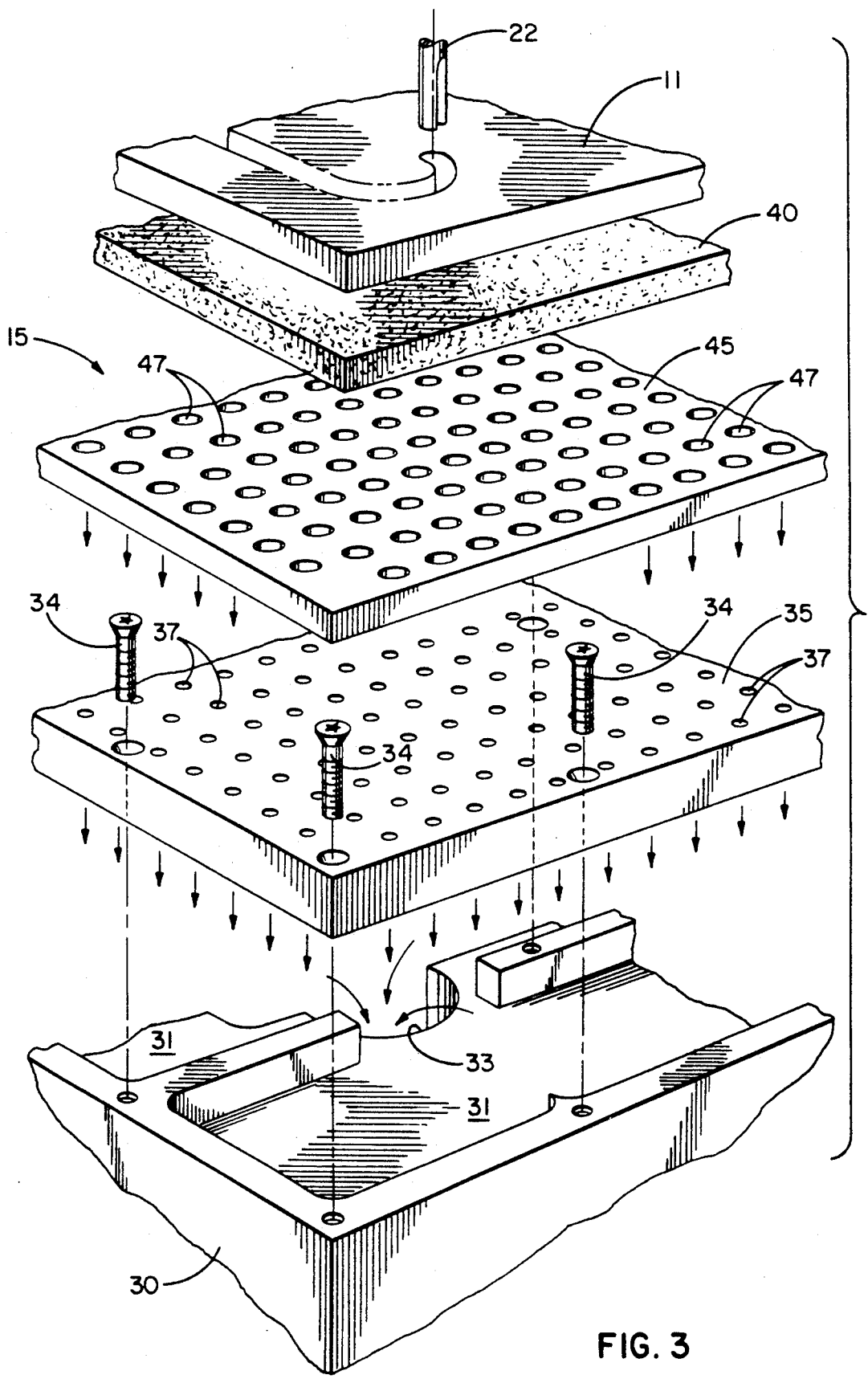
FIG. 3 is an exploded perspective view of the components of the chuck shown in FIG. 1.

As shown most clearly in FIGS. 2 and 3, the work table 15 includes a base member 30 fastened to the bed 13 and formed with several upwardly opening cavities or plenums 31. Formed through the base 30 is a hole 33 which establishes communication between the plenums and a vacuum source such as a vacuum pump. The base 30 of a typical work table 15 includes several plenums which can be selectively connected to or isolated from the vacuum source. As a result, the entire surface area of the table may be subjected to vacuum if the workpiece is large or only selected grids of the table may be subjected to vacuum if the router 10 is operating on a smaller workpiece.

Overlying the upper side of the base 30 and secured thereto by screws 34 (FIG. 3) is a flat and rigid plate 35 which is made from aluminum or other metal, the plate herein having a thickness of about ½". The plate closes off the upper sides of the plenums 31 and causes each plenum to define a vacuum chamber. Several laterally spaced rows of longitudinally spaced holes 37 are formed through the plate to enable vacuum to be drawn through the plate across virtually its entire area. In this particular instance, each hole has a diameter of about ⅛" and adjacent holes are spaced from one another by about 1".

The metal plate 35 is a precisely machined component and is a permanent part of the table 15. When the router bit 22 cuts completely through the workpiece 11 in order to cut the workpiece into individual piece parts, steps must be taken to insure that the lower end of the router bit does not cut into and damage the plate 35.

In accordance with the present invention, damage to the plate 35 is avoided and yet an extremely good vacuum holding force is established for the workpiece 11 by using a sheet 40 of open cellfoam to form the upper surface of the table 15 and the supporting surface for the workpiece. During cutting of the workpiece, the router bit 22 also cuts through the foam sheet but, as will be explained subsequently, is prevented from cutting into the metal plate 35. By using the foam sheet 40, the need for customized spoiler plates or similar customized components for spacing the piece parts above the plate 35 is completely avoided.

The preferred foam sheet 40 is reticulated open cell polyurethane foam having a thickness of about ⅜" when in a normal or uncompressed condition and having a density of about 1.1 pounds per cubic foot. The foam is charcoal grey in color. A suitable foam is that sold by Rogers Foam Corporation of Summerville, Me. and designated as No. 4321. The foam sheet 40 may cover substantially the entire area of the table 15 or may cover only those areas which are subjected to vacuum when a given workpiece 11 is being cut.

In carrying out the invention, a plate 45 made of relatively soft and inexpensive material such as wood or particle board is sandwiched between the metal plate 35 and the foam sheet 40. The plate 45, which herein is made of ¼" thick particle board, is formed with a series of vertically extending holes 47 disposed in registry with the holes 37 in the plate 35. Preferably, the holes 47 are larger than the holes 37 and, in this particular instance, each hole 47 has a diameter of about ¼". Advantageously, the plate 45 may be a commercially available perforated panel of the type sold under the trade designator PEGBOARD.

Thus, the table 15 defines a vacuum chuck which is formed by the base 30 with the plenums 31, by the aluminum plate 35 with the holes 37, by the particle board 45 with the holes 47 and by the open cell polyurethane foam sheet 40. The workpiece 11 is placed on the foam sheet 40 while vacuum is absent from the plenums 31 and while the foam sheet is in a relaxed and uncompressed condition. When the foam sheet is uncompressed, its coefficient of friction is relatively low and thus the workpiece may slide in a relatively free manner on the foam and into proper position on the table 15.

After the workpiece 11 has been properly located on the foam sheet 40, vacuum is applied to appropriate ones of the plenums 31 in the base 30. The vacuum sucks air through the holes 37 and 47 and through the open cell foam sheet 40 thereby to apply suction to the workpiece 11 and to draw the workpiece downwardly. As the workpiece draws downwardly, it compresses the underlying foam sheet 40 to a thickness of about 0.030" and, as the foam compresses, its coefficient of friction increases significantly. The high coefficient of friction, together with the vacuum applied to the workpiece through the foam, causes the workpiece to be clamped tightly relative to the fixed plate 35. The relatively large-diameter holes 47 in the particle board 45 help disburse the vacuum across the foam in order to increase the hold down force.

During cutting of the workpiece 11, the router bit 22 cuts through the workpiece and also cuts through the foam 40. In certain instances where the depth of cut is not set to extreme precision, the lower end of the bit may cut into the upper surface of the particle board 45 but this is insignificant since the particle board is soft and inexpensive and may be easily and cheaply replaced when necessary. By virtue of the particle board 45 spacing the workpiece 11 above the precisely machined aluminum plate 35, the latter is not contacted by the bit 22 and thus is not damaged.

As the router bit 22 cuts through the foam sheet 40, it forms the foam into a shape corresponding to the shape of the piece part being cut. During cutting of the foam, the relatively small-diameter holes 37 in the plate 35 serve as restrictions to reduce leakage of vacuum through the foam at the cuts therein. Thus, although leakage does occur through the cuts in the foam, the restrictive effect of the holes 37 helps reduce the loss of vacuum beneath the remainder of the foam.

Once the workpiece 11 has been cut into the individual piece parts and removed from the table 15, the individual pieces of foam are discarded. The foam skeleton also is discarded and is replaced with a new sheet 40 of foam before the next workpiece is placed on the table.

From the foregoing, it will be apparent that the present invention brings to the art a new and improved vacuum chuck or work table 15 whose upper surface is formed by open cell foam 40. The foam disburses the vacuum from the plate 35 beneath the workpiece 11 and coacts with the particle board 45 to prevent the router bit 22 from cutting into the plate 35. The particle board 45 not only spaces the workpiece 11 above the plate 35 but its holes 47 coact with the holes 37 in the plate 35 to disburse the vacuum beneath the foam 40 while restricting leakage of the vacuum as the foam is cut.

By virtue of using the foam sheet 40, each new workpiece 11 requires only a new foam sheet and does not require spoiler plates customized to the individual piece parts. Thus, the use of the foam sheet results in a significant savings in material, labor and storage space.

While the invention has been specifically disclosed in conjunction with a router 10 having a rotating router bit 22, it will be appreciated that the work table 15 with the foam top surface may be used to advantage with other types of operations where the workpiece is cut through its entire thickness. By way of example only, the work table serves equally well when drilling operations are being performed on the workpiece.

I claim:

1. A vacuum chuck for supporting and clamping a workpiece during cutting of the workpiece by a tool, said chuck comprising a base having an upper side, a first generally horizontal plate overlying the upper side of said base, a vacuum chamber defined between said base and said plate and adapted to communicate with a vacuum source, a series of holes of predetermined diameter extending vertically through said plate and communicating with said chamber, a second plate overlying said first plate and made of a softer material than said first plate, a series of holes extending vertically through said second plate and located in registry with the holes in said first plate, the holes in said second plate having a diameter greater than the diameter of the holes in said first plate, and a sheet of open cell foam covering said second plate and closing off the holes therein, said workpiece being supported by said foam sheet and being clamped downwardly against said foam sheet when vacuum is applied to said chamber, said tool cutting into said foam sheet during cutting of said workpiece by said tool.

2. A vacuum chuck as defined in claim 1 in which said sheet is open cell polyurethane foam.

3. A vacuum chuck as defined in claim 2 in which said sheet has an uncompressed thickness of approximately 5/16".

4. A vacuum chuck as defined in claim 3 in which said sheet has a density of approximately 1⅜ pounds per cubic foot.

5. A vacuum chuck as defined in claim 1 in which the diameter of the holes in said second plate is approximately twice the diameter of the holes in said first plate.

* * * * *